United States Patent [19]

Springer et al.

[11] Patent Number: 5,290,922

[45] Date of Patent: Mar. 1, 1994

[54] DISAZO COMPOUNDS CONTAINING A CYANOAMIDOTRIAZINYL RADICAL AS A BRIDGING MEMBER (MIDDLE COMPONENT) AND FIBER-REACTIVE GROUPS OF THE VINYLSULFONE SERIES, SUITABLE AS DYESTUFFS

[75] Inventors: Hartmut Springer, Königstein/Taunus; Rolf Gleibner, Frankfurt am Main, both of Fed. Rep. of Germany

[73] Assignee: Hoechst Aktiengesellschaft, Frankfurt am Main, Fed. Rep. of Germany

[21] Appl. No.: 958,368

[22] PCT Filed: Jun. 27, 1991

[86] PCT No.: PCT/EP91/01208

§ 371 Date: Dec. 30, 1992

§ 102(e) Date: Dec. 30, 1992

[87] PCT Pub. No.: WO92/01021

PCT Pub. Date: Jan. 23, 1992

[30] Foreign Application Priority Data

Jul. 3, 1990 [DE] Fed. Rep. of Germany ....... 4021067

[51] Int. Cl.[5] ..................... C09B 62/513; D06P 1/384
[52] U.S. Cl. .................................. 534/642; 534/637; 544/197; 8/549
[58] Field of Search ........................................ 534/642

[56] References Cited

U.S. PATENT DOCUMENTS

| | | | |
|---|---|---|---|
| 3,758,470 | 9/1973 | Ackermann et al. | 534/637 X |
| 4,378,312 | 3/1983 | Hoyer et al. | 534/642 X |
| 4,485,041 | 11/1984 | Hoyer et al. | 534/637 X |
| 4,649,193 | 3/1987 | Meininger et al. | 534/642 X |
| 4,806,127 | 2/1989 | Schlafer et al. | 534/617 X |

FOREIGN PATENT DOCUMENTS

| | | |
|---|---|---|
| 0040806 | 12/1981 | European Pat. Off. |
| 3320972 | 1/1992 | Fed. Rep. of Germany |
| 2066070 | 8/1971 | France |
| 62-132968 | 6/1987 | Japan |
| 2007698 | 5/1979 | United Kingdom |

*Primary Examiner*—Mary C. Lee
*Assistant Examiner*—Fiona T. Powers

[57] ABSTRACT

Disazo compounds which possess fiber-reactive groups and have useful dye properties and are capable of dyeing hydroxyl- and/or carboxamido-containing materials, in particular fiber materials, such as cellulose fibers and natural and synthetic polyamide, such as wool, in strong, fast shades. They conform to the formula

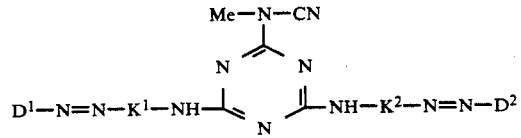

wherein the substituents are as defined in the specification.

12 Claims, No Drawings

DISAZO COMPOUNDS CONTAINING A CYANOAMIDOTRIAZINYL RADICAL AS A BRIDGING MEMBER (MIDDLE COMPONENT) AND FIBER-REACTIVE GROUPS OF THE VINYLSULFONE SERIES, SUITABLE AS DYESTUFFS

The invention relates to the field of fiber-reactive dyes.

Fiber-reactive azo dyes which contain two radicals of azo chromophores which are each connected to a triazine radical via an amino group are known for example from U.S. Pat. Nos. 4,485,041 and 4,806,127, British Patent No. 2,007,698, German Offenlegungschrift 3,320,972 and Japanese Patent Publication Sho 62-132,968. However, increased expectations of the quality of dyeings and of the economics of the dyeing process have made it necessary to develop improved dyes. This is because especially the dyeing of cellulose fiber materials, such as cotton, by the cold pad-batch method requires dyes which are readily soluble and which are highly reactive at the low dyeing and fixing temperatures. They should have a high degree of fixation to be not only economically but also ecologically advantageous. Moreover, the dyeings obtained should be dischargeable, for example in order to be able to be used as a ground dyeing in discharge printing.

This object is achieved according to the present invention by the water-soluble disazo dyes of the formula (1), indicated and defined hereinafter, which have very good fiber-reactive dyeing properties.

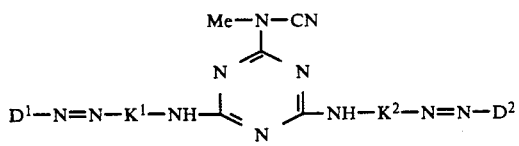
(1)

In the formula (1):

Me is hydrogen or an alkali metal, such as sodium, potassium or lithium;

$K^1$ is a radical of the formula (2a)

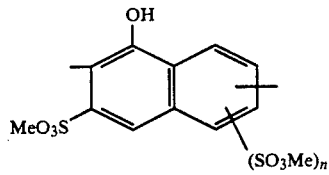
(2a)

where

Me has one of the abovementioned meanings and n is zero or 1 (if zero, this group being hydrogen);

$K^2$ is a radical of the formula (2b)

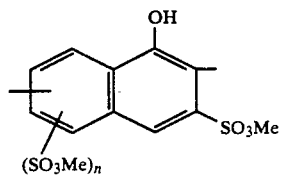
(2b)

where Me and n are each as defined above;

$D^1$ and $D^2$ are each independently of the other a group of the formula (3a), (3b) or (3c)

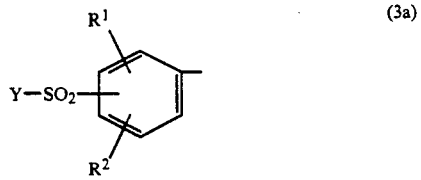
(3a)

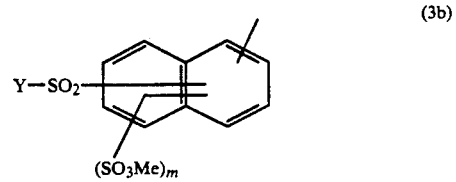
(3b)

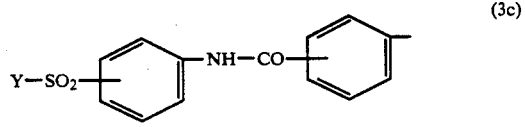
(3c)

where

Me has one of the abovementioned meanings, $R^1$ is hydrogen, alkyl of from 1 to 4 carbon atoms, such as ethyl and in particular methyl, which may be sulfo-, carboxyl- or sulfato-substituted, alkoxy of from 1 to 4 carbon atoms, such ethoxy and in particular methoxy, which may be sulfo-, carboxyl- or sulfato-substituted, chlorine, bromine, hydroxyl, cyano, carboxyl or sulfo, preferably hydrogen, methyl, methoxy or ethoxy, $R^2$ is hydrogen, alkyl of from 1 to 4 carbon atoms, such as ethyl and in particular methyl, or alkoxy of from 1 to 4 carbon atoms, such as ethoxy and in particular methoxy, preferably hydrogen or methoxy, Y is vinyl, or ethyl which contains in the β-position a substituent which is eliminable by alkali to form a vinyl group, and m is zero, 1 or 2 (if zero, this group being hydrogen).

In the formula (3a) the group $Y-SO_2-$ is preferably bonded to the benzene ring meta or para to the free bond leading to the azo group, and in the formula (3c) this group is preferably bonded to the benzene ring meta or para to the aminocarbonyl group. In the formula (3b) the free bond which leads to the azo group is preferably in the 2-position of naphthalene radical.

The individual variables can be identical or different relative to one another within their meanings.

Substituents which are in the β-position of the ethyl group of the variable Y and which are alkali-eliminable are for example alkanoyloxy groups of from 2 to 5 carbon atoms, such as acetyloxy groups, aroyloxy groups, such as benzoyloxy, sulfobenzoyloxy or carboxybenzoyloxy, alkyl- and dialkyl-amino groups having alkyl moieties of from 1 to 4 carbon atoms, such as in particular dimethylamino and diethylamino, trialkylammonium groups having alkyl moieties of from 1 to 4 carbon atoms, such as trimethylammonium, the anion thereof being a customary colorless anion, such as chloride, hydrogensulfate or sulfate, alkylsulfonyloxy groups from 1 to 4 carbon atoms, such as methylsulfonyloxy, fluorine or bromine and in particular a phosphato, thiosulfato or sulfato group. Preferably, the Y-SO$_2$ is vinylsulfonyl or β-chloroethylsulfonyl, β-thiosulfatoethylsulfonyl or β-sulfatoethylsulfonyl, in particular β-sulfatoethyl.

Sulfo, carboxyl, sulfato, thiosulfato and phosphato groups are groups of the formula —SO$_3$Me, —COOMe, —OSO$_3$Me, —S—SO$_3$ME or —OPO$_3$Me$_2$, in each of which Me has one of the abovementioned meanings.

The radicals D$^1$ and D$^2$ are for example:
2-(β-sulfatoethylsulfonyl)phenyl,
3-(β-sulfatoethylsulfonyl)phenyl,
4-(β-sulfatoethylsulfonyl)phenyl,
2-carboxy-5-(β-sulfatoethylsulfonyl)phenyl,
2-chloro-3-(β-sulfatoethylsulfonyl)phenyl,
2-chloro-4-(β-sulfatoethylsulfonyl)phenyl,
2-ethoxy-4-(β-sulfatoethylsulfonyl)phenyl,
2-ethoxy-5-(β-sulfatoethylsulfonyl)phenyl,
2-ethyl-4-(β-sulfatoethylsulfonyl)phenyl,
2-methoxy-5-(β-sulfatoethylsulfonyl)phenyl,
2,4-diethoxy-5-(β-sulfatoethylsulfonyl)phenyl,
2,4-dimethoxy-5-(β-sulfatoethylsulfonyl)phenyl,
2,5-dimethoxy-4-(β-sulfatoethylsulfonyl)phenyl,
2-methoxy-5-methyl-4-(β-sulfatoethylsulfonyl)phenyl,
2-(β-thiosulfatoethylsulfonyl)phenyl,
3-(β-thiosulfatoethylsulfonyl)phenyl,
4-(β-thiosulfatoethylsulfonyl)phenyl,
2-methoxy-5-(β-thiosulfatoethylsulfonyl)phenyl,
2-sulfo-4-(β-phosphatoethylsulfonyl)phenyl,
2-sulfo-4-(vinylsulfonyl)phenyl,
2-chloro-4-(β-chloroethylsulfonyl)phenyl,
2-chloro-5-(β-chloroethylsulfonyl)phenyl,
3-(β-acetyloxyethylsulfonyl)phenyl,
4-(β-acetyloxyethylsulfonyl)phenyl,
2-hydroxy-5-(β-sulfatoethylsulfonyl)phenyl,
2-methoxy-5-[β-(N-methyltauryl)ethylsulfonyl]phenyl,
5-(β-sulfatoethylsulfonyl)naphth-2-yl,
6-(β-sulfatoethylsulfonyl)naphth-2-yl,
7-(β-sulfatoethylsulfonyl)naphth-2-yl,
8-(β-sulfatoethylsulfonyl)naphth-2-yl,
6-(β-sulfatoethylsulfonyl)-1-sulfonaphth-2-yl,
5-(β-sulfatoethylsulfonyl)-1-sulfonaphth-2-yl,
8-(β-sulfatoethylsulfonyl)-6-sulfonaphth-2-yl,
2-bromo-3-(β-sulfatoethylsulfonyl)phenyl and
2-bromo-4-(β-sulfatoethylsulfonyl)phenyl.

Preferably, the radicals D$^1$ and D$^2$ are groups of identical structure.

Preferably, the radical —K$^1$—NH— is a radical of the formula (4a), (4b) or (4c)

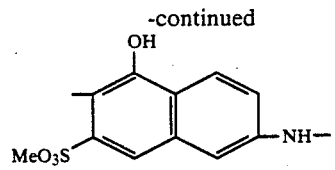

(4a)

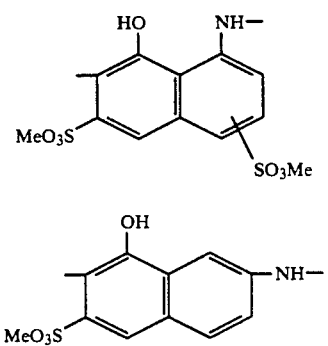

(4b)

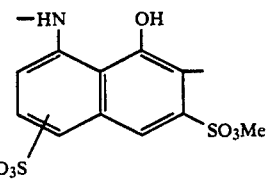

(4c)

where Me has the abovementioned meaning, and preferably —NH—K$^2$— is a radical of the formula (5a), (5b) or (5c)

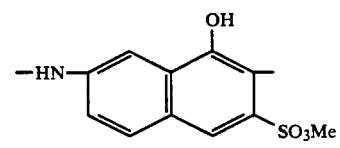

(5a)

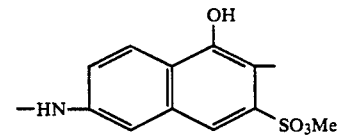

(5b)

(5c)

where Me has the abovementioned meaning and in the formulae (4a) and (5a) the —SO$_3$Me group is in each case meta or para to the amino group. Particularly preferably, the radicals —K$^1$—NH— and —NH—K$^2$— are each a radical of the formula (4a) or (5a) where again the —SO$_3$Me group is preferably meta to the amino group.

The present invention further relates to a process for preparing the disazo compounds of the formula (1) which comprises coupling a compound of the formula (6)

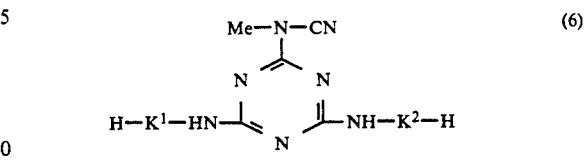

(6)

where K$^1$, K$^2$ and Me are each as defined above, in any desired order or simultaneously with the diazonium compounds of the aromatic amines of the formulae D$^1$—NH$_2$ and D$^2$—NH$_2$, where D$^1$ and D$^2$ are each as defined above and may be identical to or different from each other, in equivalent amounts.

The process of the present invention is carried out using two mole equivalents of the aromatic amine as diazo component in the coupling reaction, providing D$^1$ and D$^2$ are identical. If D$^1$ and D$^2$ are different from each other, their diazonium salts can be coupled simultaneously, in a mixture, to the compound of the formula (6), or the diazonium salt of one of the amines is initially reacted with the compound (6) and then the diazonium salt of the second amine is reacted with the resulting monoazo compound to form the disazo compound of formula (1).

The diazotization of the amines $D^1$—$NH_2$ and $D^2$—$NH_2$ is effected in a conventional manner, for example in aqueous medium by means of nitrous acid (for example by means of sodium nitrite in an aqueous solution of a mineral acid, such as hydrochloric acid or sulfuric acid) at a temperature between −5° C. and +15° C. and at a pH below 2. According to the present invention, the coupling reaction is carried out in an aqueous medium at a temperature of between 5° and 40° C., preferably between 10° and 25° C., and at a pH of between 3.5 and 7.5, preferably between 4 and 6.

The disazo compounds of the formula (1) according to the present invention can also be prepared according to the present invention by reacting a compound of the formula (7)

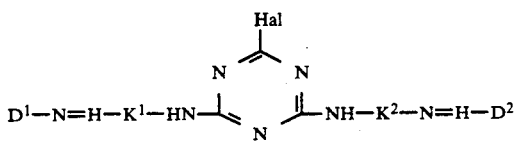

where $D^1$, $D^2$, $K^1$ and $K^2$ are each as defined above and Hal is halogen, such as fluorine or in particular chlorine, with cyanamide or an alkali metal salt of cyanamide. This reaction preferably takes place in an aqueous medium at a pH of between 8 and 2, preferably between 4 and 2, and at a temperature of between 40° and 95° C., preferably between 60° and 95° C.

The starting compounds of the formula (7) are known for example from above-cited U.S. Pat. No. 4,485,041 and British Patent 2,007,698.

The starting compounds of the formula (6) are obtained by reacting a trihalo-s-triazine, such as cyanuric fluoride or in particular cyanuric chloride, with cyanamide or an alkali metal salt of cyanamide at a pH between 5 and 10, preferably between 7 and 9, and at a temperature between −10° C. and +20° C., preferably between −5° C. and +5° C. The reaction can take place in an aqueous-organic medium or in an aqueous medium. Organic solvents which are used in an aqueous-organic medium are those which are chemically inert toward the reactants, for example chlorobenzene or acetone. The resulting cyanamido-dihalo-s-triazine is then reacted in an equivalent amount with a compound of the formula H-$K^1$-$NH_2$ and H-$K^2$-$NH_2$, where $K^1$ and $K^2$ are each as defined above and can be identical to or different from each other. The first condensation reaction takes place at a temperature of between −5° C. and +40° C., preferably between 0° C. and 20° C., and at a pH of between 2 and 7, preferably between 3 and 5, and these reactions can likewise be carried out in an aqueous-organic medium of the abovementioned kind, but are preferably carried out in an aqueous medium. The second condensation reaction takes place at a pH between 2 and 7, preferably between 3 and 5, and at a temperature of between 60° and 90° C.

It is similarly possible to prepare the starting compounds of the formula (6) by reacting starting compounds conforming to the formula (8)

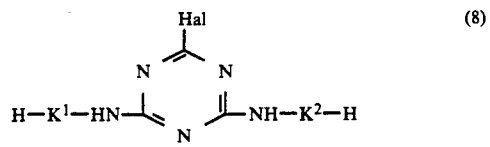

where $K^1$, $K^2$ and Hal are each as defined above, which are likewise known from the abovementioned U.S. Pat. No. 4,485,041 or GB Patent 2,007,698, with cyanamide or an alkali metal salt of cyanamide in a manner similar to the conditions specified above for the preparation of the compounds of the formula (7).

The disazo compounds of the formula (1) of the present invention can be converted in respect of their fiber-reactive radicals Y—$SO_2$— into compounds of otherwise the same structure but with a grouping where Y is another group by known methods, for example starting from the compounds having a β-sulfatoethylsulfonyl or β-chloroethylsulfonyl group into those in which Y is vinyl, and starting from compounds having the β-chloroethylsulfonyl or vinylsulfonyl group into those where Y is β-thiosulfatoethyl. For instance, the vinylsulfonyl compounds are preparable from their corresponding β-chloroethylsulfonyl compounds or compounds where Y is an ethyl group which contains in the β-position an ester group of an organic or inorganic acid as substituent, for example sulfato or acetyloxy, by the action on these compounds of an alkali in an aqueous medium at a pH between 10 and 12 and at a temperature of between 20° and 50° C. and, depending on the temperature, for from 10 minutes to 3 hours, for example at a temperature of 50° C. for from 10 to 20 minutes or at a temperature of 25° C. for from two to three hours, and starting from the β-chloroethylsulfonyl or the vinylsulfonyl compound it is possible to prepare the corresponding β-thiosulfatoethylsulfonyl compound at a pH between 4 and 9 and at a temperature between 20° and 60° C. by reaction with sodium thiosulfate.

The separation and isolation of the disazo compounds of the formula (1) prepared according to the present invention from the synthesis solutions can be effected by a generally known method, for example either by precipitating from the reaction medium by means of electrolytes, such as sodium chloride or potassium chloride, or by evaporating the reaction solution, for example by spray drying, with or without a buffer substance having been added to the synthesis solution.

The disazo compounds of the formula (1) according to the present invention hereinafter compounds (1)—have fiber-reactive properties and possess very good dye properties. They can therefore be used for dyeing (including printing) hydroxyl- and/or carboxamido-containing fiber materials. Moreover, the solutions obtained in the synthesis of the compounds (1) can be used directly in dyeing as a liquid preparation with or without the addition of a buffer substance and with or without prior concentrating.

The present invention therefore also provides for the use of the novel compounds (1) for dyeing (including printing) hydroxyl- and/or carboxamido-containing fiber materials or rather processes for the application thereof to these substrates. Methods similar to known methods can be employed.

Hydroxyl-containing materials are those of natural or synthetic origin, for example cellulose fiber materials or their regenerated products and polyvinyl alcohols. Cellulose fiber materials are preferably cotton but also other vegetable fibers, such as linen, hemp, jute and ramie fibers; regenerated cellulose fibers are for example staple viscose and filament viscose.

Carboxamido-containing materials are for example synthetic and natural polyamides and polyurethanes in the form of fibers, for example wool and other animal hairs, silk, leather, nylon-6.6, nylon-6, nylon-11 and nylon-4.

The compounds (1) can be applied, as provided for by the use according to the present invention, to the substrates mentioned and fixed thereon by the known application processes for water-soluble dyes, in particular fiber-reactive dyes, for example by applying the compound (1) to the substrate in dissolved form or introducing it therein and fixing it thereon or therein with or without heating and/or with or without action of an alkaline agent. Such dyeing and fixing techniques have been numerously described not only in the technical literature but also in the patent literature, for example in European Patent Application Publication No. 0 181 585A. Owing to their ready solubility in water, they are also particularly suitable for the cold pad-batch process.

The compounds (1) produce not only on carboxamido-containing materials, in particular on wool, but also on hydroxyl-containing materials, in particular cellulose fiber material, yellow to bluish red dyeings and prints having good fastness properties, such as good pleating, hot press and crock fastness properties and in particular a good light fastness and good wet fastness properties, of which in particular the chlorinated water and perspiration fastness properties may be singled out. Furthermore, the compounds (1) are suitable for use in ground dyeings, since dyeings obtainable with the compounds (1) are dischargeable under alkaline and/or reductive conditions and thus can be systematically decolored. Similarly, the compounds (1) are suitable for use in ground dyeings with a subsequent alkaline colored discharge, for example using vat dyes.

The Examples which follow serve to illustrate the invention. Parts and percentages are by weight, unless otherwise stated. Parts by weight bear the same relation to parts by volume as the kilogram to the liter.

The compounds described in these Examples with a formula are indicated in the form of the free acids; in general, they are prepared and isolated in the form of their sodium or potassium salts and used for dyeing in the form of their salts. Similarly, the starting compounds and components mentioned in the form of the free acid in the subsequent Examples, in particular table examples, can be used in the synthesis as such or in the form of their salts, preferably alkali metal salts, such as sodium or potassium salts. The absorption maxima ($\lambda_{max}$ values) indicated for the visible region were determined on aqueous solutions of the alkali metal salts.

EXAMPLE 1 a) 184 parts of cyanuric chloride are suspended in a mixture of 1000 parts of ice and water in the presence of a commercial dispersant, 42 parts of cyanamide are added, and the reaction is completed at a temperature of 0° to 5° C. and at a pH maintained between 7.5 and 8. Then 320 parts of 1-amino-8-naphthol-3,6-disulfonic acid are added; the pH decreases in the course of the subsequent reaction, and it is then maintained at 2.0 while the temperature is gradually raised to 30° C. After this reaction has ended, a further 310 parts of 1-amino-8-naphthol-3,6-disulfonic acid are added, and the third condensation reaction is completed at 80° C. and at a pH between 5.0 and 5.5. The reaction batch is cooled down to about 50° C., the precipitated compound is isolated by filtration, and the filter residue is washed with water and dried.

The alkali metal salt (sodium salt) of the compound (A)

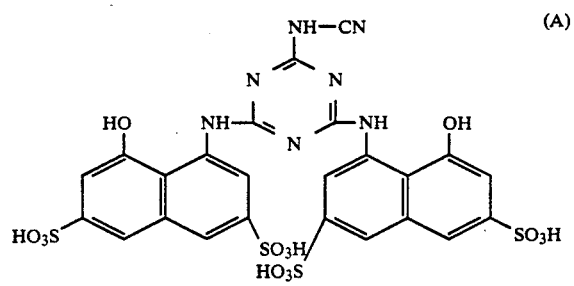

is obtained in the form of an electrolyte(sodium-chloride)-containing powder. The product shows in KBr an IR band at 2193 cm$^{-1}$.

b) A suspension of 79.1 parts of the sodium salt of the compound of the formula (A) in 200 parts of water is added to a conventionally prepared acidic, aqueous diazonium salt suspension of 56 parts of 4-($\beta$-sulfatoethylsulfonyl)aniline and the coupling reaction is carried out at pH 4.5 and at a temperature of from 15° to 20° C. The synthesis solution is subsequently clarified, and the disazo compound of the present invention is precipitated by means of potassium chloride and isolated.

The compound of the present invention is obtained in the form of an alkali metal salt (predominantly potassium salt). In form of a free acid it has the formula

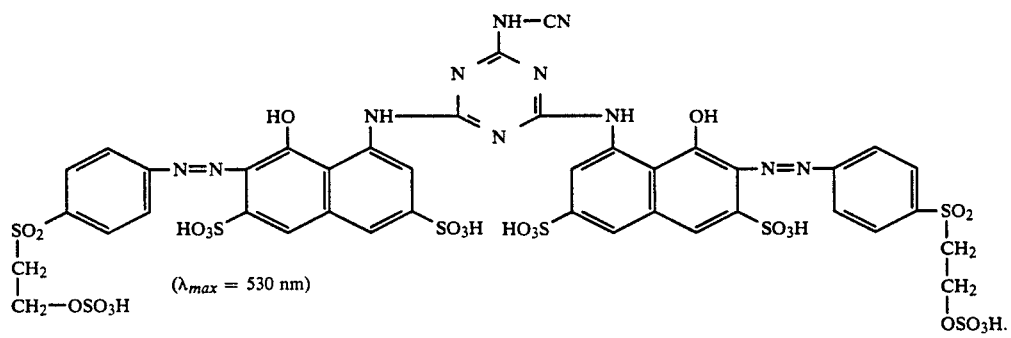

($\lambda_{max}$ = 530 nm)

The disazo compound of the present invention has very good fiber-reactive dye properties and applied to the materials mentioned in the description, in particular cellulose fiber materials, by the application and fixing methods customary in the art of fiber-reactive dyes produces strong bright red dyeings having good fastness properties, of which in particular the alkaline perspiration light fastness and the chlorinated water fastness may be singled out.

EXAMPLE 2

A conventionally prepared acidic, aqueous diazonium salt solution of 41.1 parts of 6-(β-sulfatoethylsulfonyl)-2-aminonaphthalene-1-sulfonic acid is gradually added to a suspension of 39.4 parts of the sodium salt of the compound of the formula (A) in 200 parts of water and the coupling reaction is carried out while maintaining a pH of 4.5 and a temperature of from 15° to 20° C. After the coupling reaction has ended, the synthesis and then a solution of the lithium salt of 60 parts of 1-amino-8-naphthol-4,6-disulfonic acid in 200 parts of water is added. The two condensation reactions are carried out initially at 20° C. and later, after the temperature has been raised, at 90° C. and the pH is maintained at 7.0 with an aqueous lithium hydroxide solution. After the reaction has ended (which is verifiable by a thin layer chromatography), the batch is admixed with a conventionally prepared aqueous, acidic diazonium salt suspension of 52.2 parts of 4-(β-sulfatoethylsulfonyl)aniline and the coupling reactions are carried out at about 20° C. and a pH maintained at 4.5. The synthesis solution is then clarified and the filtrate is evaporated to dryness.

The novel alkali metal salt (sodium salt) of the disazo compound of the formula solution is clarified, and the disazo compound of the present invention is salted out by means of the sodium chloride and isolated.

The alkali metal salt (sodium salt) of the disazo compound of the formula

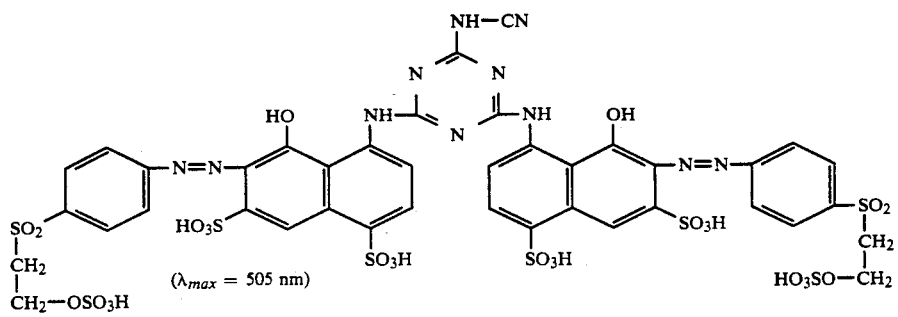

($\lambda_{max}$ = 505 nm)

is obtained in the form of an electrolyte (predominantly sodium chloride)-containing powder. The disazo compound of the present invention has very good fiber-reactive dye properties and applied by the application methods customary for fiber-reactive dyes produces

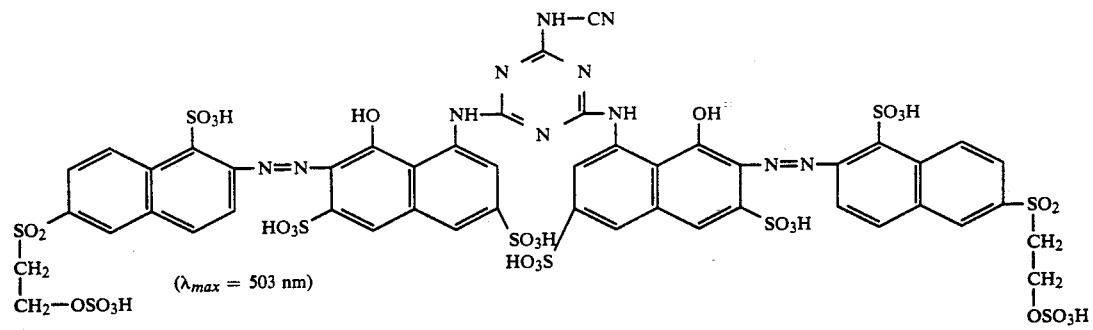

($\lambda_{max}$ = 503 nm)

is obtained in the form of an electrolyte (sodium chloride)-containing powder. The disazo compound of the present invention has very good fiber-reactive dye properties and applied by the application method known in the art produces strong, fast, bluish red dyeings and prints having good fastness properties, of which in particular the chlorine fastness properties can be singled out.

EXAMPLE 3

First 18.4 parts of cyanuric chloride are reacted as described in Example 1a) with 4.2 parts of cyanamide strong, fast, bright red dyeings and prints having good fastness properties.

EXAMPLE 4

To prepare a disazo compound of the present invention, the procedure of Example 3 is repeated, except that the 1-amino-8-naphthol-4,6-disulfonic acid is replaced as one of the starting compounds by an equivalent amount of 2-amino-8-naphthol-6-sulfonic acid, affording the alkali metal salt of the compound of the formula

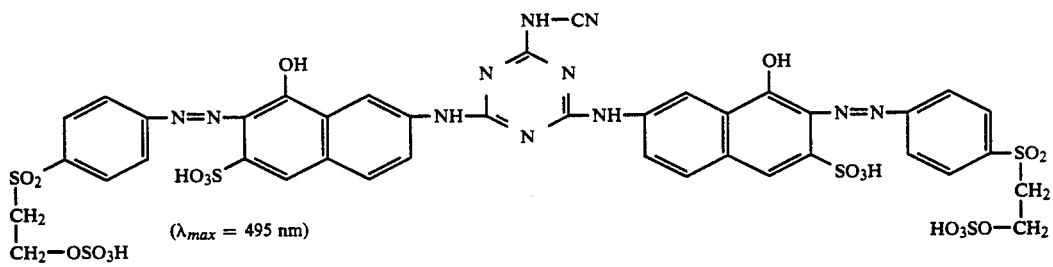

($\lambda_{max}$ = 495 nm)

which likewise has fiber-reactive dye properties and applied by the customary application methods dyes the materials mentioned in the description, in particular cellulose-fiber materials, such as cotton, in strong, reddish orange, fast shades.

EXAMPLE 5

First 18.4 parts of cyanuric chloride are reacted with 4.2 parts of cyanamide and 30.0 parts of 1-amino-8-naphthol-3,6-disulfonic acid as described in Example 1a). After this dicondensation product has been prepared, a neutral solution of 31.0 parts of 1-amino-8-naphthol-4,6-disulfonic acid in 200 parts of water is added and the third condensation reaction is carried out at a pH of 6.0 and a temperature of 80° C. Thereafter the coupling reaction is carried out as described in Example 1b) by adding a conventionally prepared aqueous, acidic diazonium salt suspension of 52.2 parts of 4-(β-sulfatoethylsulfonyl)aniline, the synthesis solution is clarified and the alkali metal salt of the novel disazo compound of the formula

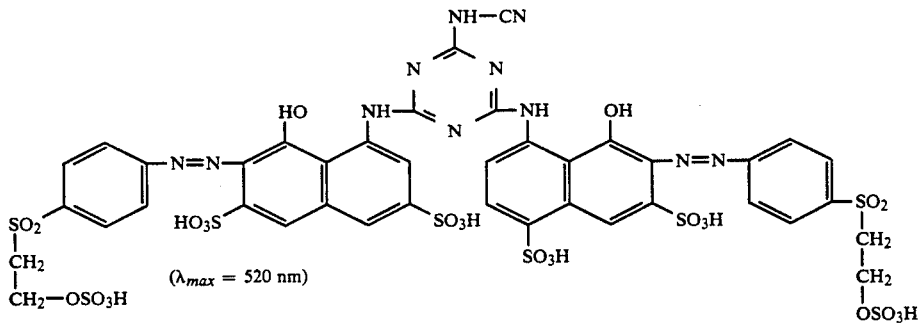

($\lambda_{max}$ = 520 nm)

is isolated in the form of an electrolyte-containing powder by evaporating the filtrate to dryness.

Applied as a dye having fiber-reactive properties it dyes in particular cellulose fiber materials, such as cotton, in strong red shades having good fastness properties.

EXAMPLES 6 TO 19

The table examples below describe further novel disazo compounds in terms of the formula (B)

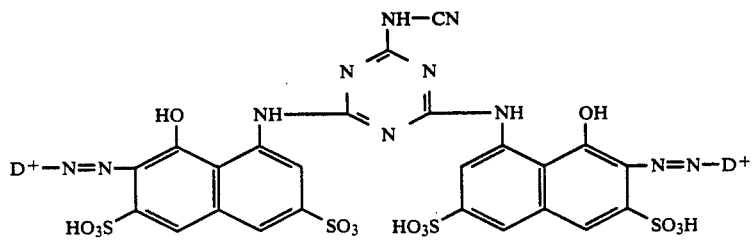

They can be prepared in the manner of the present invention from the starting components evident from the particular table example in conjunction with the formula (B), for example in a manner similar to the above Examples 1 to 5. They have very good fiber-reactive dye properties and applied to the materials mentioned in the description, in particular cellulose fiber materials, by the known application and fixing methods dye these materials in the strong, fast shades indicated for the particular table example.

| Example | Disazo compound (B) with radical D* | Hue |
| --- | --- | --- |
| 6 | 3-(β-sulfatoethylsulfonyl)phenyl | red (528) |
| 7 | 2-carboxy-5-(β-sulfatoethylsulfonyl)phenyl | red |
| 8 | 2-ethoxy-5-(β-sulfatoethylsulfonyl)phenyl | bluish red |
| 9 | 2-methoxy-5-β-sulfatoethylsulfonyl)phenyl | bluish red |
| 10 | 4-vinylsulfonylphenyl | red (518) |
| 11 | 2,5-dimethoxy-4-(β-sulfatoethylsulfonyl)phenyl | red (530) bluish red |
| 12 | 5-methyl-2-methoxy-4-(β-sulfatoethylsulfonyl)phenyl | reddish violet |
| 13 | 2,5-dimethyl-4-(β-sulfatoethylsulfonyl)phenyl | reddish violet |

| Example | Disazo compound (B) with radical D* | Hue |
|---|---|---|
| 14 | 2-sulfo-4-(β-sulfatoethyl-sulfonyl)phenyl | red (510) |
| 15 | 4-[N-(3'-β-sulfatoethyl-sulfonyl)phenyl]-amidocarbonylphenyl | red |
| 16 | 2-sulfo-5-(β-sulfatoethyl-sulfonyl)phenyl | red |
| 17 | 6-(β-sulfatoethylsulfonyl)naphth-2-yl | violet |
| 18 | 8-(β-sulfatoethylsulfonyl)-6-sulfonaphth-2-yl | bluish red |
| 19 | 5-β-sulfatoethylsulfonyl)-naphth-1-yl | bluish red |

EXAMPLES 20 TO 33

The table examples below describe further novel disazo compounds in terms of the formula (C)

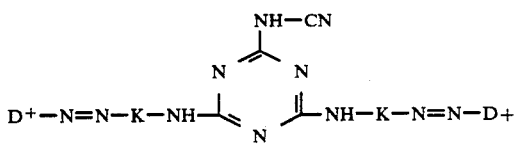

They can be prepared in the manner of the present invention from the starting components evident from the particular table example in conjunction with the formula (C), for example in a manner similar to one of the above embodiment examples. They have very good fiber-reactive dye properties and applied to the materials mentioned in the description, in particular cellulose fiber materials, by the known application and fixing methods dye these materials in the strong, fast shades indicated for the particular table example.

| Example | Disazo compound of the formula (C) with Radical D* | Component H—K—NH$_2$ | Hue |
|---|---|---|---|
| 20 | 4-vinylsulfonyl-phenyl | 1-amino-4,6-disulfo-8-naphthol | red |
| 21 | 3-(β-sulfatoethyl-sulfonyl)phenyl | 1-amino-4,6-disulfo-8-naphthol | red |

Disazo compound of the formula (C) with

| Example | Radical D* | Component H—K—NH$_2$ | Hue |
|---|---|---|---|
| 22 | 1-sulfo-6-(β-sulfato-ethylsulfonyl)naphth-2-yl | " | reddish violet (528) |
| 23 | 2-methoxy-5-(β-sul-fatoethylsulfonyl)-phenyl | " | bluish red |
| 24 | 2-sulfo-5-(β-sulfato-ethylsulfonyl)phenyl | " | red |
| 25 | 3-(β-sulfatoethyl-sulfonyl)phenyl | 2-amino-6-sulfo-8-naphthol | orange |
| 26 | 2-methoxy-5-(β-sulfatoethyl-sulfonyl)phenyl | " | reddish brown |
| 27 | 6-sulfo-8-(β-sulfatoethyl-sulfonyl)napth-2-yl | " | orange |
| 28 | 1-sulfo-6-(β-sulfatoethyl-sulfonyl)naphth-2-yl | " | orange (500) |

| Example | Disazo compound of the formula (C) with Radical D* | Component H—K—NH$_2$ | Hue |
|---|---|---|---|
| 29 | 4-(β-thiosulfato-ethylsulfonyl)phenyl | 3-amino-6-sulfo-8-naphthol | orange |
| 30 | 4-β-sulfatoethyl-sulfonyl)phenyl | " | orange |
| 31 | 3-β-sulfatoethyl-sulfonyl)phenyl | " | orange |
| 32 | 6-sulfo-8-(β-sulfatoethyl-sulfonyl)naphth-2-yl | " | orange |
| 33 | 2-methoxy-5-(β-sulfatoethyl-sulfonyl)phenyl | " | reddish orange |

What is claimed is:

1. A disazo compound conforming to the formula (1)

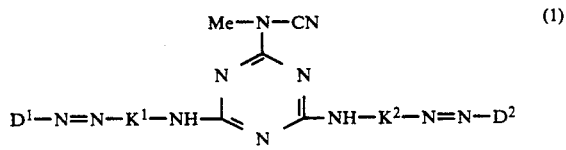

where
Me is hydrogen or an alkali metal;
K$^1$ is a radical of the formula (2a)

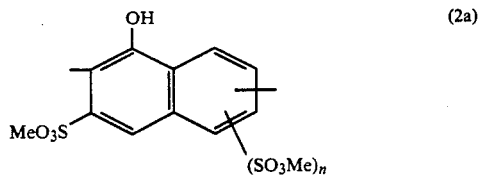

where
Me has one of the abovementioned meanings and
n is zero or 1 (if zero, this group being hydrogen);
K$^2$ is a radical of the formula (2b)

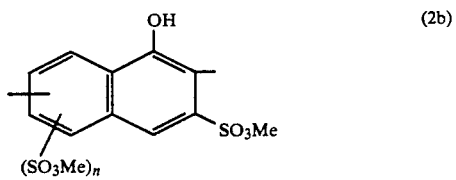

where Me and n are each as defined above;
D$^1$ and D$^2$ are each independently of the other a group of the formula (3a), (3b) or (3c)

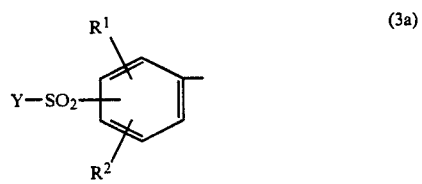

-continued

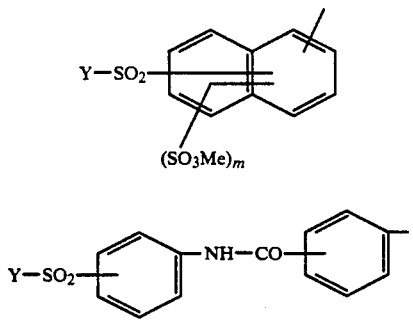
(3b)

Y—SO₂—◯◯—NH—CO—◯— (3c)

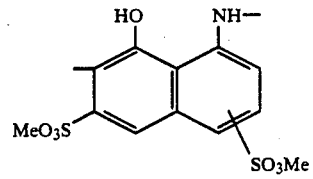
(4a)

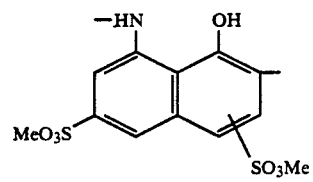
(5a)

where
Me has one of the abovementioned meanings,
R¹ is hydrogen, alkyl of from 1 to 4 carbon atoms, which maybe sulfo-, carboxyl- or sulfato-substituted, alkoxy of from 1 to 4 carbon atoms, which may be sulfo-, carboxyl- or sulfato-substituted, chlorine, bromine, hydroxyl, cyano, carboxyl or sulfo,
R² is hydrogen, alkyl of from 1 to 4 carbon atoms or alkoxy of from 1 to 4 carbon atoms,
Y is vinyl, or ethyl which contains in the β-position a substituent which is eliminable by alkali to form a vinyl group, and
m is zero, 1 or 2 (if zero, this group being hydrogen).

2. A disazo compound as claimed in claim 1, wherein K¹ and K² are groups of identical structure.

3. A disazo compound as claimed in claim 1 or 2, wherein D¹ and D² are identical.

4. A disazo compound as claimed in at least one of claims 1 to 3, wherein in the formula (2a) and in the formula (2b) n is 1.

5. A disazo compound as claimed in claim 4, wherein the radical —K¹—NH— is a radical of the formula (4a) and the radical —NH—K²— is a radical of the formula (5a)

where Me is as defined in claim 1.

6. A disazo compound as claimed in claim 1, 2, 3, 4 or 5, wherein D¹ or D² or both are 1-sulfo-6-(β-sulfatoethylsulfonyl)naphth-2-yl.

7. A disazo compound as claimed in claim 1, wherein D¹ or D² or both are 1-sulfo-6-(β-sulfatoethylsulfonyl)-naphth-2-yl.

8. A disazo compound as claimed in claim 1, wherein Y is vinyl, β-thiosulfatoethyl, β-chloroethylsulfonyl or β-sulfatoethyl.

9. A disazo compound as claimed in claim 2 or 3, wherein in the formula 2(a) and the formula 2(b) n is 1.

10. A disazo compound as claimed in claim 8, wherein Y is 62-sulfatoethyl.

11. A process for dyeing and printing hydroxyl- and/or carboxamido-containing material, in which a dye is applied to or introduced into the material and fixed thereon or therein by means of heat or with the aid of an alkaline agent or by means of heat and with the aid of an alkaline agent, which comprises using as the dye a dye of claim 1.

12. A process as claimed in claim 11, wherein said material is fiber material.

* * * * *

UNITED STATES PATENT AND TRADEMARK OFFICE
CERTIFICATE OF CORRECTION

PATENT NO. : 5,290,922
DATED : March 1, 1994
INVENTOR(S) : Hartmut Springer, Rolf Gleissner It is certified that error appears in the above-indentified patent and that said Letters Patent is hereby corrected as shown below:

<u>TITLE PAGE, ITEM [75]</u>

The spelling of the second inventor's name should be --Rolf Gleissner--.

In claim 4, at column 15, lines 34 to 35, "at least one of claims 1 to 3" should read --claim 1--.

In claim 6, at column 16, lines 20 and 21, "1-sulfo-6-(ß-sulfatoethylsulfonyl)naphth-2-yl" should read --4-(ß-sulfatoethylsulfonyl)phenyl--.

In claim 8, at column 16, line 26, "ß-chloroethylsulfonyl" should read --ß-chloroethyl-.

In claim 10, at column 16, line 31, "62-sulfatoethyl" should read --ß-sulfatoethyl--.

Signed and Sealed this

Seventeenth Day of January, 1995

Attest:

BRUCE LEHMAN

*Attesting Officer*     *Commissioner of Patents and Trademarks*